US012789717B2

(12) United States Patent
Fan et al.

(10) Patent No.: US 12,789,717 B2
(45) Date of Patent: Nov. 10, 2026

(54) VEHICLE-MOUNTED DISPLAY

(71) Applicant: Tianjin Yunfan Electronic Technology Co., Ltd., Tianjin (CN)

(72) Inventors: Qingzhuang Fan, Tianjin (CN); Shengshi Wang, Tianjin (CN)

(73) Assignee: Tianjin Yunfan Electronic Technology Co., Ltd., Tianjin (CN)

( * ) Notice: Subject to any disclaimer, the term of this patent is extended or adjusted under 35 U.S.C. 154(b) by 0 days.

(21) Appl. No.: 19/450,851

(22) Filed: Jan. 16, 2026

(65) Prior Publication Data

US 2026/0138541 A1 May 21, 2026

Related U.S. Application Data

(63) Continuation-in-part of application No. 18/918,058, filed on Oct. 17, 2024, now Pat. No. 12,559,042.

(30) Foreign Application Priority Data

Dec. 31, 2025 (CN) ......................... 202522843587.9

(51) Int. Cl.
*B60R 11/02* (2006.01)
*B60R 11/00* (2006.01)

(52) U.S. Cl.
CPC ..... *B60R 11/0235* (2013.01); *B60R 2011/005* (2013.01); *B60R 2011/007* (2013.01);
(Continued)

(58) Field of Classification Search
CPC ..... B60R 2011/0001; B60R 2011/0003; B60R 2011/0005; B60R 2011/0007;
(Continued)

(56) References Cited

U.S. PATENT DOCUMENTS 6,702,604 B1 * 3/2004 Moscovitch ........ B60R 11/0235 361/679.41
10,836,325 B1 * 11/2020 Seko .................. B60R 11/0241
(Continued)

OTHER PUBLICATIONS

"ULDIGI Phone Stand Car Mount" https://www.amazon.co.uk/ULDIGI-Holder-Charger-Magnetic-Support/dp/BOD988X4Z6?th=1 Date first available Jul. 11, 2024 (Year: 2024).*

*Primary Examiner* — Nathnael Aynalem

(57) ABSTRACT

A vehicle-mounted display includes a display device, a support, a first input mechanism, a first electrical connection mechanism, and a second electrical connection mechanism. The display device is arranged with a first connection portion on a back side of the display device. The support is configured to support the display device and arranged with a second connection portion. The second connection portion is detachably connectable to the first connection portion. The first input mechanism is arranged on the support. The first electrical connection mechanism is arranged on the first connection portion. The second electrical connection mechanism is arranged on the second connection portion and electrically connected to the first input mechanism. When the first connection portion is connected to the second connection portion, the first electrical connection mechanism is electrically connected to the second electrical connection mechanism.

13 Claims, 7 Drawing Sheets

(52) U.S. Cl.
CPC ................. *B60R 2011/0073* (2013.01); *B60R 2011/0089* (2013.01); *B60R 2011/0096* (2013.01); *B60Y 2410/10* (2013.01); *B60Y 2410/115* (2013.01)

(58) Field of Classification Search
CPC ....... B60R 2011/0057; B60R 2011/007; B60R 11/0229; B60R 11/0235; B60R 11/0241; F16M 11/14; F16M 11/041; H02J 7/0044; H04M 1/04
USPC .................................................. 348/148, 837
See application file for complete search history.

(56) References Cited

U.S. PATENT DOCUMENTS

2019/0054865 A1* 2/2019 Hsu ......................... B60R 11/04
2023/0051385 A1* 2/2023 Ma ...................... B60R 11/0241

* cited by examiner

VEHICLE-MOUNTED DISPLAY

CROSS REFERENCE TO RELATED APPLICATIONS

This application is a continuation-in-part of the U.S. application Ser. No. 18/918,058, filed on Oct. 17, 2024. This application claims priority of the Chinese patent application No. 202522843587.9, filed on Dec. 31, 2025, the disclosure of which is hereby incorporated by reference in its entirety.

FIELD OF THE DISCLOSURE

The present disclosure relates to the field of automotive accessories, and particularly relates to a vehicle-mounted display.

BACKGROUND

Vehicle-mounted displays are generally used to be mounted above a central control console of a vehicle, thereby providing an additional electronic display area for the vehicle. Existing vehicle-mounted displays have a display device and a support. The display device is generally fixed to the support via bolts, and connection cables for the central control console of the vehicle and reversing camera are plugged to the display device. However, such existing vehicle-mounted displays are troublesome to be mounted and inconvenient for removing and adjusting the display device.

SUMMARY

The following presents a simplified summary of the disclosure in order to provide a basic understanding of some aspects of the disclosure. This summary is not an extensive overview of the disclosure. It is not intended to identify critical elements or to delineate the scope of the disclosure. Its sole purpose is to present some concepts of the disclosure in a simplified form as a prelude to the more detailed description that is presented elsewhere.

In some embodiments, a vehicle-mounted display is provided. The vehicle-mounted display includes a display device, a support, a first input mechanism, a first electrical connection mechanism, and a second electrical connection mechanism. The display device is arranged with a first connection portion on a back side of the display device. The support is configured to support the display device and arranged with a second connection portion. The second connection portion is detachably connectable to the first connection portion. The first input mechanism is arranged on the support. The first electrical connection mechanism is arranged on the first connection portion. The second electrical connection mechanism is arranged on the second connection portion and electrically connected to the first input mechanism. When the first connection portion is connected to the second connection portion, the first electrical connection mechanism is electrically connected to the second electrical connection mechanism.

BRIEF DESCRIPTION OF THE DRAWINGS

Illustrative embodiments of the present disclosure are described in detail below with reference to the attached drawing figures.

NUMERAL REFERENCE IN THE DRAWINGS

Figure 1:
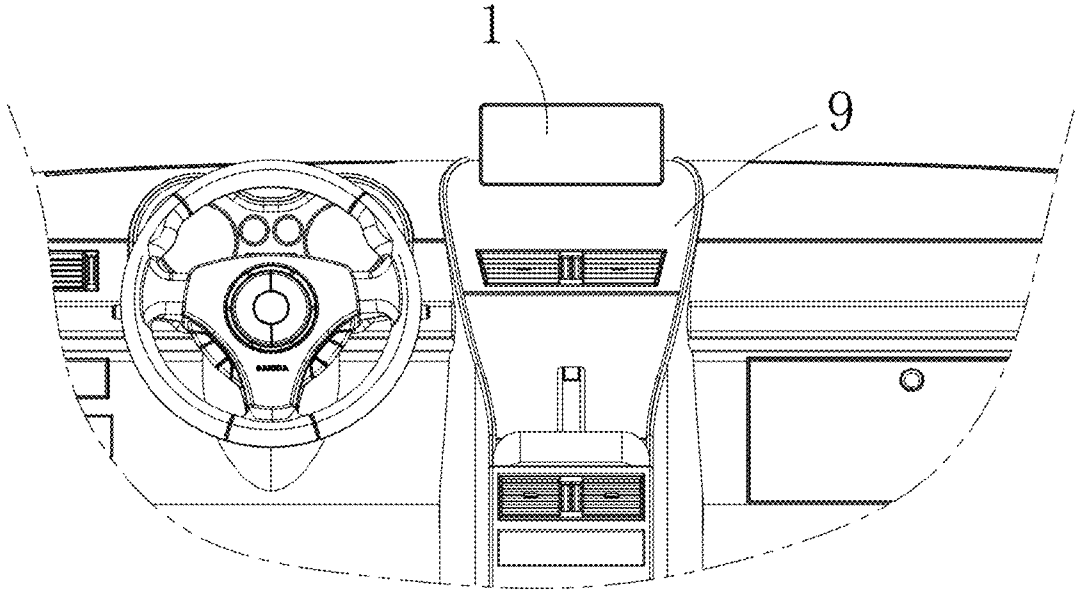
FIG. 1 is a schematic view showing a use state of a vehicle-mounted display mounted on a central control console according to an embodiment of the present disclosure.

1—display device; 11—back side of display device; 1001—first connection portion; 1002—first mating member; 10021—mating recess; 101—back shell; 102—display module; 103—heat dissipation port; 100—first cavity;

2—support; 2001—second connection portion; 2002—second mating member; 20021—mating protrusion; 21—connecting member; 22—mounting base; 23—support rod; 24—first locking member; 25—second locking member; 231—first end of support rod; 232—second end of support rod; 211—connecting plate; 212—first ball joint portion; 2121—first clamping block; 2122—first ball socket; 221—mounting plate; 222—second ball joint portion; 2221—second clamping block; 2222—second ball socket; 2101—first housing; 2102—second housing; 210—second cavity;

3—first input mechanism; 31—first power interface; 32—first audio/video signal input interface;

4—first electrical connection mechanism;

5—second electrical connection mechanism;

6—first magnetic attraction assembly; 61—first magnetic member; 62—second magnetic member;

7—second magnetic attraction assembly; 71—third magnetic member; 72—fourth magnetic member;

8—second input mechanism; 81—second power interface; 82—second audio/video signal input interface;

9—central control console.

DETAILED DESCRIPTION

The following describes some non-limiting exemplary embodiments of the disclosure with reference to the accompanying drawings. The described embodiments are merely a part rather than all of the embodiments of the disclosure. All other embodiments obtained by a person of ordinary skill in the art based on the embodiments of the disclosure shall fall within the scope of the disclosure.

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

Referring to FIGS. 1 to 7, the present disclosure provides a vehicle-mounted display, including a display device 1, a support 2, a first input mechanism 3, a first electrical connection mechanism 4, and a second electrical connection mechanism 5.

A first connection portion 1001 may be arranged on a back side 11 of the display device 1, and the first electrical connection mechanism 4 may be arranged on the first connection portion 1001. The support 2 may be mounted to a central control console 9 of a vehicle and support the display device 1. The support 2 may be arranged with a second connection portion 2001, and the second electrical connection mechanism 5 may be arranged on the second connection portion 2001. The second electrical connection mechanism 5 may specifically be a pogo pin male connector, and the first electrical connection mechanism 4 may specifically be a pogo pin female connector.

Figure 2:
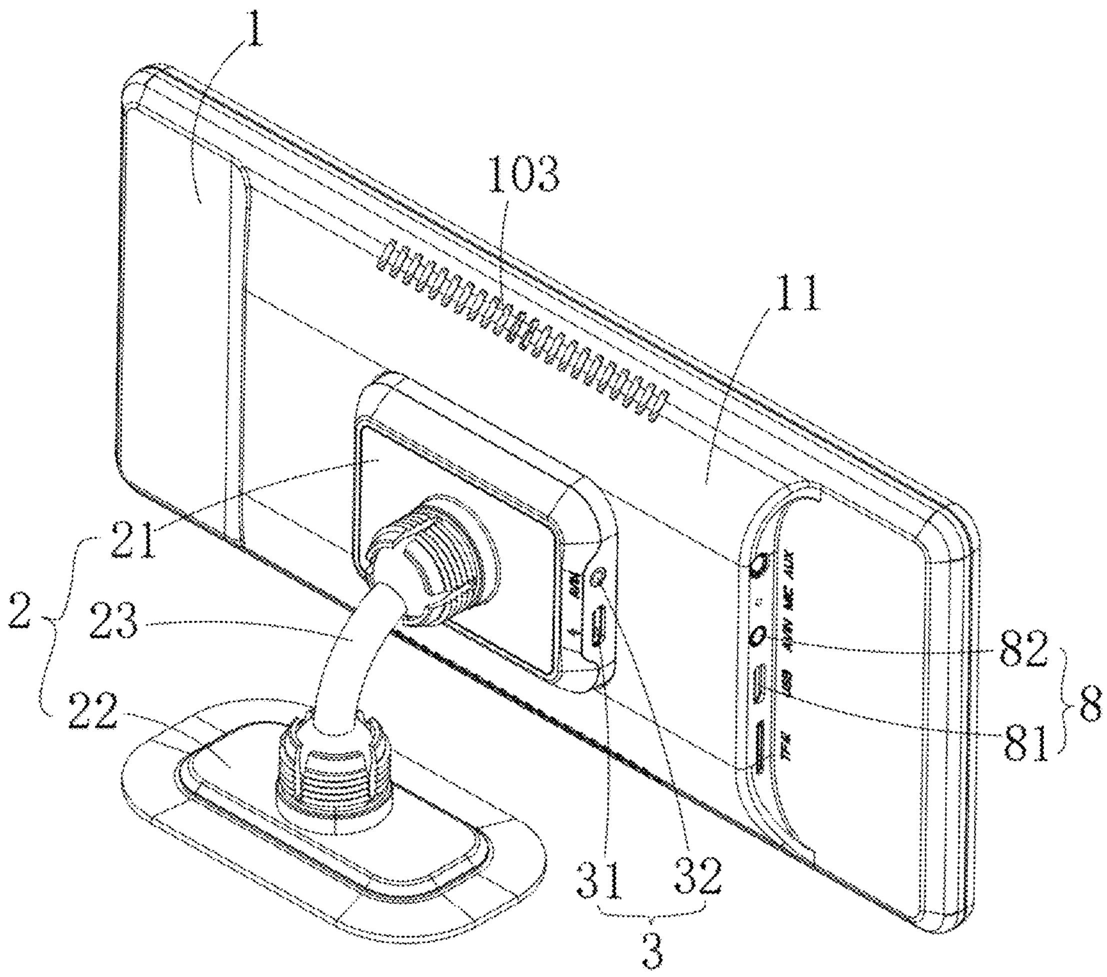
FIG. 2 is a schematic view of an overall structure of the vehicle-mounted display according to an embodiment of the present disclosure.

Furthermore, as shown in FIG. 2, the first input mechanism 3 may be arranged on the support 2 and may be electrically connected with external cables. The first input mechanism 3 may be electrically connected to the second electrical connection mechanism 5. The first input mechanism 3 may include, for example, an audio/video signal input interface for a reversing camera and a power supply interface connected to the central control console 9 of the vehicle.

The second connection portion 2001 may be detachably connectable to the first connection portion 1001, and when the first connection portion 1001 is connected to the second connection portion 2001, an electrical connection between the first electrical connection mechanism 4 and the second electrical connection mechanism 5 may be achieved. Correspondingly, external cables may be electrically connected to the display device 1 via the first electrical connection mechanism 4 and the second electrical connection mechanism 5, achieving power supply to the display device 1.

Therefore, for a removal and remounting process of the display device 1, the vehicle-mounted display may not require unplugging external cables, facilitating the removal and adjustment of the display device 1. Thus, when leaving the vehicle, a user may directly take off the display device 1 and carry the display device 1 away. Upon returning to the vehicle, the user may remount the display device 1 to the support 2, and the display device 1 may be started directly. This design may facilitate user disassembly, assembly, and carrying and also have a theft-prevention effect to a certain extent.

Regarding a detachable connection manner between the first connection portion 1001 and the second connection portion 2001, in some embodiments, magnetic attraction connection may be adopted. Specifically, the vehicle-mounted display may further include a first magnetic attraction assembly 6 and a second magnetic attraction assembly 7. The first magnetic attraction assembly 6 may be arranged on the first connection portion 1001, and the second magnetic attraction assembly 7 may be arranged on the second connection portion 2001. The first magnetic attraction assembly 6 and the second magnetic attraction assembly 7 may be magnetically attractable to each other to enable the first connection portion 1001 and the second connection portion 2001 to be connected to each other or separated from each other.

Specifically, during mounting, first, the support 2 may be mounted at a suitable position on the central control console 9 by means of attachment, clamping, etc. Then, the back side 11 of the display device 1 may be brought close to the support 2, and the display device 1 may automatically adhere to the support 2 due to magnetic attraction. When the first magnetic attraction assembly 6 and the second magnetic attraction assembly 7 are attracted to each other, an electrical contact between the first electrical connection mechanism 4 and the second electrical connection mechanism 5 may be simultaneously achieved, enabling power supply to the display device 1. In this way, a mounting and removal process of the display device 1 may be thus quick and convenient.

Figure 6:
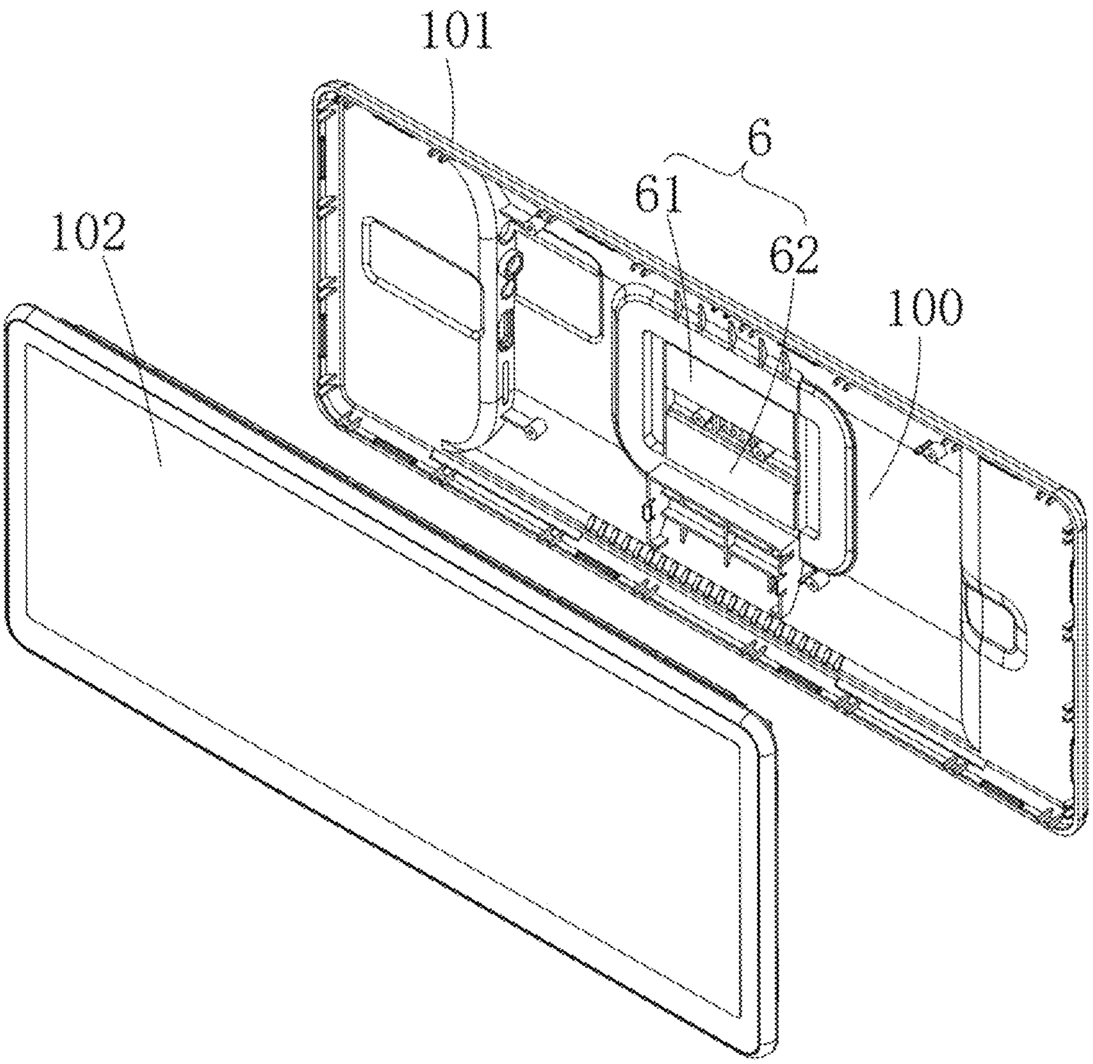
FIG. 6 is a schematic view showing a position of a first magnetic attraction assembly in the display device according to an embodiment of the present disclosure.
Figure 7:
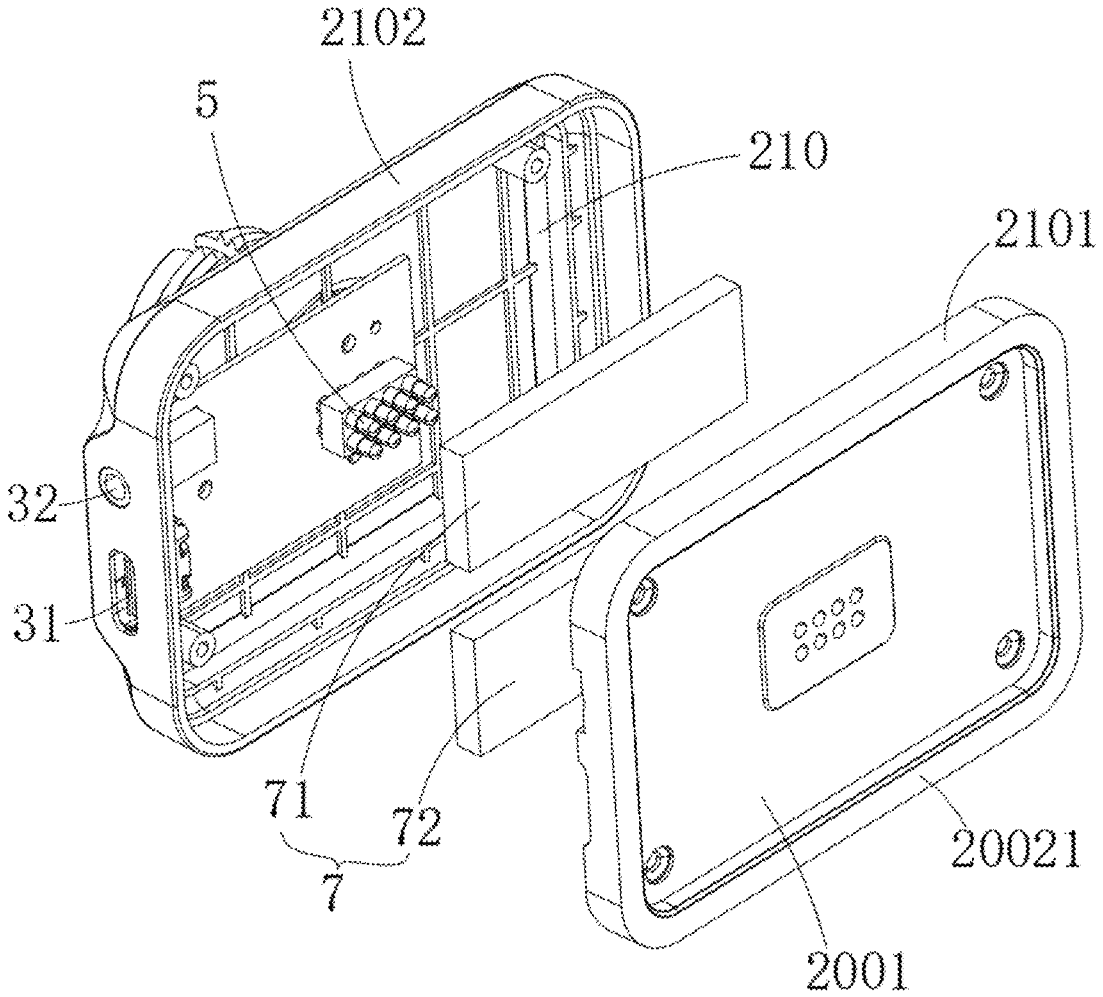
FIG. 7 is a schematic view showing an internal structure of the connecting plate according to an embodiment of the present disclosure.

In some embodiments, to prevent the display device 1 from being mounted backwards, the vehicle-mounted display may also have a fool-proof design. In some embodiments, a principle of magnetic attraction or repulsion may be relied upon to achieve a fool-proof mounting of the display device 1. Referring to FIGS. 6 and 7, specifically, the first magnetic attraction assembly 6 may include a first magnetic member 61 and a second magnetic member 62, and the second magnetic attraction assembly 7 may include a third magnetic member 71 and a fourth magnetic member 72. The first magnetic member 61 and the third magnetic member 71 may magnetically attract each other, and the first magnetic member 61 and the fourth magnetic member 72 may be magnetically repel each other. The second magnetic member 62 and the fourth magnetic member 72 may magnetically attract each other, and the second magnetic member 62 and the third magnetic member 71 may magnetically repel each other. The first magnetic member 61 may be mounted on an upper side of the first connection portion 1001, and the second magnetic member 62 may be mounted on a lower side of the first connection portion 1001. The third magnetic member 71 may be mounted on an upper side of the second connection portion 2001, and the fourth magnetic member 72 may be mounted on a lower side of the second connection portion 2001. Therefore, only when the display device 1 is placed upright, with the upper side of the first connection portion 1001 facing the upper side of the second connection portion 2001, the first magnetic attraction assembly 6 and the second magnetic attraction assembly 7 may be attracted to each other. When the display device 1 is inverted, resulting in the lower side of the first connection portion 1001 facing the upper side of the second connection portion 2001, a magnetic repulsion between the first magnetic attraction assembly 6 and the second magnetic attraction assembly 7 may prevent connection between the first connection portion 1001 and the second connection portion 2001. This mechanism may alert the user to a potential reverse mounting of the display device 1.

In other embodiments, physical structural mating may be relied upon to achieve fool-proof mounting of the display device 1. Specifically, referring to FIGS. 3 and 4, the first connection portion 1001 may be arranged with a first mating member 1002, and the second connection portion 2001 may be arranged with a second mating member 2002 which may mate with the first mating member 1002. When the first mating member 1002 and the second mating member 2002 are mated and connected with each other, the first electrical connection mechanism 4 and the second electrical connection mechanism 5 may be brought into an electrical contact with each other.

In some of these embodiments, one of the first mating member 1002 and the second mating member 2002 may be a mating recess 10021, and the other of the first mating member 1002 and the second mating member 2002 may be a mating protrusion 20021. The mating protrusion 20021 may be inserted in the mating recess 10021, achieving a mounting and positioning of the first connection portion 1001 and the second connection portion 2001 through a shape adaptation of the mating recess 10021 and the mating protrusion 20021. The mating recess 10021 and the mating protrusion 20021 may both be in annular shapes, such as matching square, circular, triangular, pentagonal, etc., annular shapes. In some of these embodiments, the mating recess 10021 may also be a columnar recess, and the mating protrusion 20021 may also be a columnar protrusion. A plurality of columnar recesses and columnar protrusions may also be provided to achieve a connection and positioning of the first connection portion 1001 and the second connection portion 2001. This embodiment is not shown in the drawings.

Figure 4:
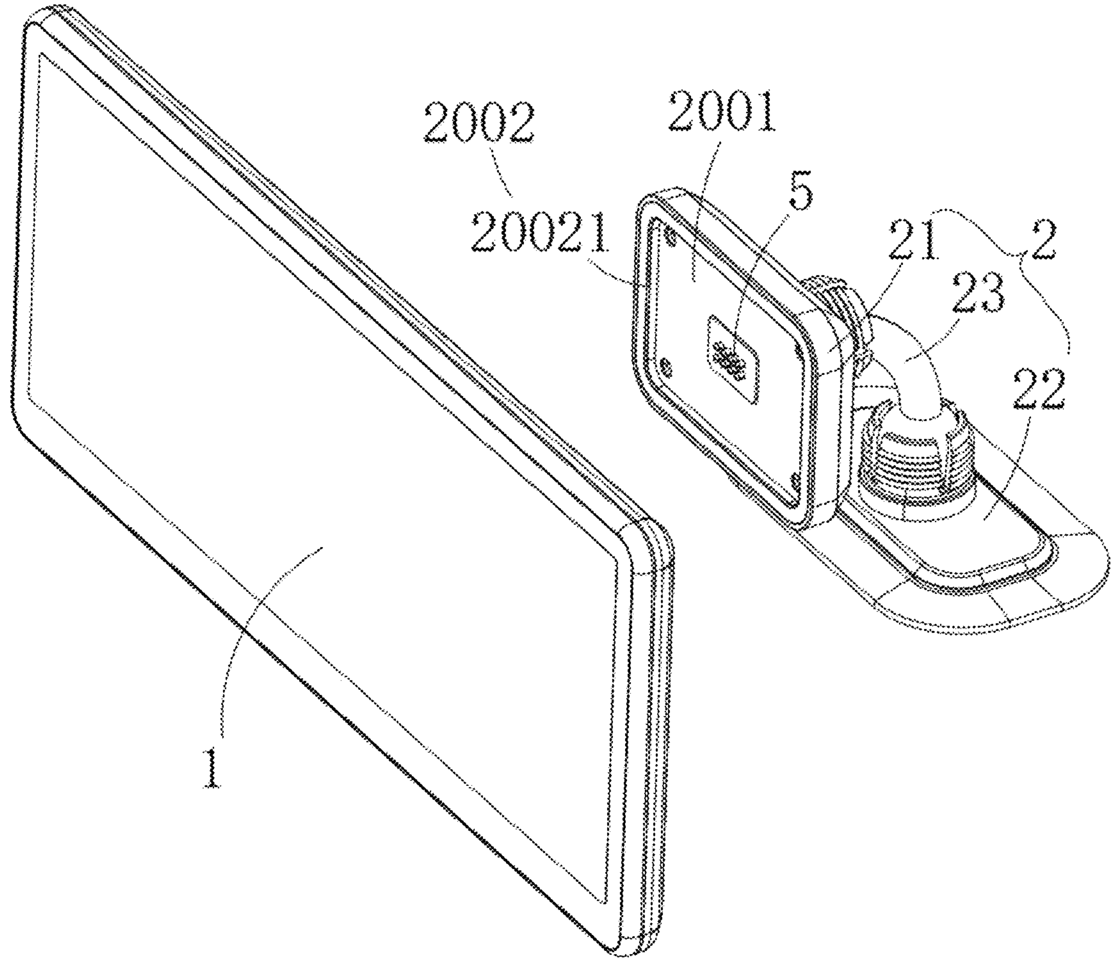
FIG. 4 is a second schematic diagram showing the connection relationship between the display device and the support according to an embodiment of the present disclosure.

In some embodiments, the mating recess 10021 may be formed on the first connection portion 1001, and the mating protrusion 20021 may be formed on the second connection portion 2001. Furthermore, as shown in FIG. 4, the mating protrusion 20021 may be arranged surrounding an outer edge of the second connection portion 2001. A first magnetic attraction area may be located in an area enclosed by the mating recess 10021, and a second magnetic attraction area may be located in an area enclosed by the mating protrusion 20021. Moreover, the first electrical connection mechanism 4 may be arranged at a center of the first magnetic attraction area, and the second electrical connection mechanism 5 may be arranged at a center of the second magnetic attraction area. When the mating protrusion 20021 is inserted in the mating recess 10021, the first magnetic attraction area and the second magnetic attraction area may be perfectly matched with each other and abut against each other, causing the first electrical connection mechanism 4 to be precisely in an electrical contact with the second electrical connection mechanism 5.

In some embodiments, the first input mechanism 3 may include at least one of a first power interface 31 and a first audio/video signal input interface 32. The first power interface 31 and the first audio/video signal input interface 32 may be both used for connecting to corresponding external cables. For example, the first power interface 31 may be connected to a power supply of the vehicle, and the first audio/video signal input interface 32 may be matched with devices such as a driving recorder or a reversing camera.

Figure 3:
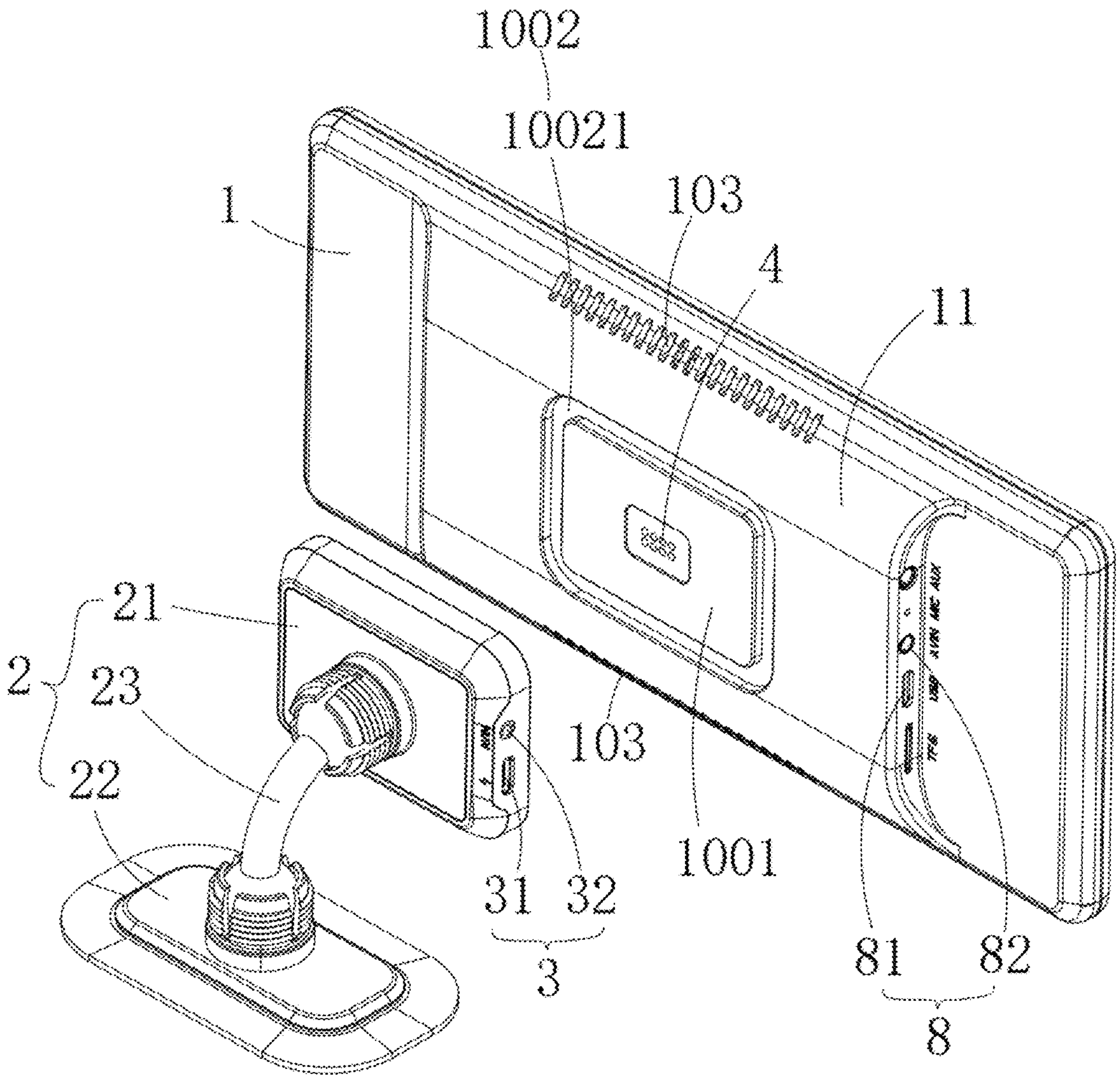
FIG. 3 is a first schematic view showing a connection relationship between a display device and a support according to an embodiment of the present disclosure.

Of course, to provide users with more options for connection locations, in some embodiments, referring to FIGS. 2 and 3, the vehicle-mounted display may further include a second input mechanism 8. The second input mechanism 8 may be arranged on the display device 1 and may include at least one of a second power interface 81 and a second audio/video signal input interface 82. The second power interface 81 and the first power interface 31 may be of a same type of interface. The second audio/video signal input interface 82 and the first audio/video signal input interface 32 may be of a same type of interface. Users may choose to use either the first input mechanism 3 or the second input mechanism 8 to connect external cables.

Moreover, when the display device 1 is connected to the support 2, the first power interface 31, first audio/video signal input interface 32, second power interface 81, and second audio/video signal input interface 82 may all face a same side of the vehicle-mounted display. Having the connection ports face the same side may facilitate a cable arrangement of the vehicle-mounted display.

Regarding the structure of the support 2, in some embodiments, the support 2 may be of a fixed base structure. When the display device 1 is mounted on the support 2, a position of the display device 1 relative to the central control console 9 may be fixed. This embodiment is not shown in the drawings.

Figure 5:
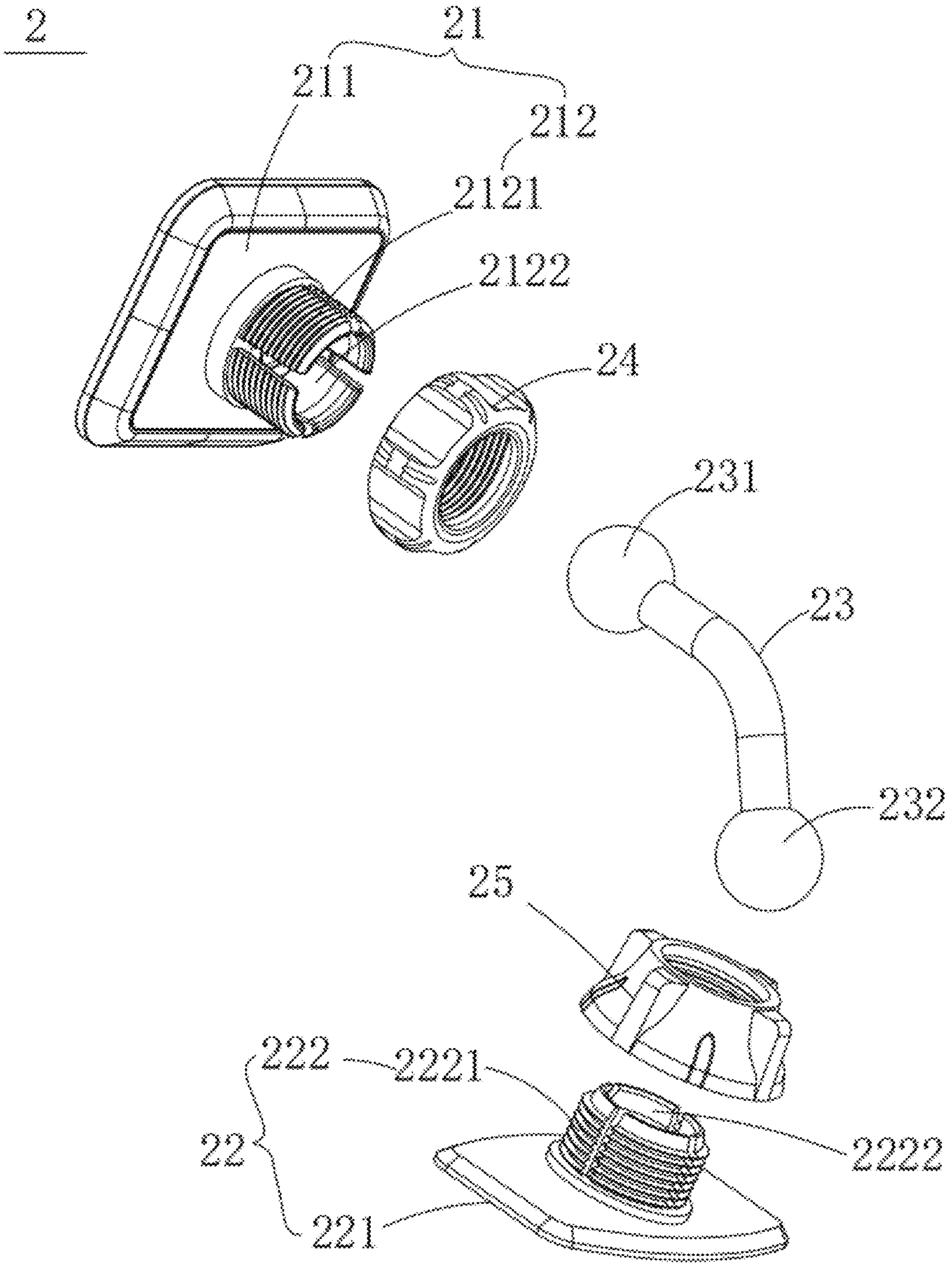
FIG. 5 is an exploded assembly view of the support according to an embodiment of the present disclosure.

Regarding the structure of the support 2, in other embodiments, referring to FIG. 5, the support 2 may include a connecting member 21, a mounting base 22, and a support rod 23. The second connection portion 2001 may be located on the connecting member 21, and when the first connection portion 1001 and the second connection portion 2001 are mated and connected with each other, the connecting member 21 may be abut against the back side 11 of the display device 1. The mounting base 22 may be mounted to the central control console 9 of the vehicle, for example, the mounting base 22 may be fixed to the central control console 9 by means of magnetic attraction, adhesion, etc. A first end 231 of the support rod 23 may be connected to the connecting member 21, and a second end 232 of the support rod 23 may be connected to the mounting base 22.

Furthermore, to facilitate adjustment of an angle of the display device 1 relative to the support 2, in some embodiments, the connecting member 21 may include a connecting plate 211 and a first ball joint portion 212. The second connection portion 2001 may be arranged on the connecting plate 211. The first ball joint portion 212 may be arranged on a side of the connecting plate 211 away from the second connection portion 2001. A first end 231 of the support rod 23 may be of a spherical structure and may be connected to the first ball joint portion 212 in a form of a ball joint. Adjusting the angle of the display device 1 may be achieved by adjusting an angle of the connecting plate 211 relative to the support rod 23.

Of course, after the angle of the connecting plate 211 relative to the support rod 23 is adjusted, to lock a relative position between the connecting plate 211 and the support rod 23, in some embodiments, the first ball joint portion 212 may be divided to a plurality of first clamping blocks 2121. The plurality of first clamping blocks 2121 may cooperatively enclose to form a first ball socket 2122. The first end 231 of the support rod 23 may be located in the first ball socket 2122. Moreover, a first locking member 24 may be provided. The first locking member 24 may be arranged with internal threads, and an inner wall of the first locking member 24 may have a taper. The first locking member 24 may sleeve over an outer side of the first ball joint portion 212 and be threadedly connected to the first ball joint portion 212. When the first locking member 24 rotates and moves closer to the connecting plate 211, the first locking member 24 may drive the plurality of first clamping blocks 2121 to move inward and clamp the first end 231 of the support rod 23, thereby achieving locking of the relative position of the connecting plate 211 and the support rod 23.

Similarly, in some embodiments, the mounting base 22 may include a mounting plate 221 and a second ball joint portion 222. The mounting plate 221 may be attached to the central control console 9 of the vehicle. The second ball joint portion 222 may be arranged on a side of the mounting plate 221 away from the central control console 9. A second end 232 of the support rod 23 may be of a spherical structure, and the second end 232 of the support rod 23 may be connected to the second ball joint portion 222 in a form of a ball joint. A design of the second ball joint portion 222 may serve to expand an adjustment range of the display device 1.

Also, after an angle of the support rod 23 relative to the mounting base 22 is adjusted, to lock a relative position between the support rod 23 and the mounting base 22, the second ball joint portion 222 may be divided to a plurality of second clamping blocks 2221. The plurality of second clamping blocks 2221 may cooperatively enclose to form a second ball socket 2222. The second end 232 of the support rod 23 may be located in the second ball socket 2222. Moreover, a second locking member 25 may be provided. The second locking member 25 may have internal threads, and an inner wall of the second locking member 25 may have a taper. The second locking member 25 may sleeve over an outer side of the second ball joint portion 222 and be threadedly connected to the second ball joint portion 222. When the second locking member 25 rotates and moves closer to the mounting base 22, the second locking member 25 may drive the plurality of second clamping blocks 2221 to move inward and clamp the second end 232 of the support rod 23, thereby achieving locking of the relative position of the mounting base 22 and the support rod 23.

Regarding a mounting structure of the first magnetic attraction assembly 6 in the display device 1 and a mounting structure of the second magnetic attraction assembly 7 in the connecting plate 211, in some embodiments, referring to FIGS. 6 and 7, specifically, the display device 1 may include a back shell 101 and a display module 102. The back shell 101 may be connected to the display module 102. The first connection portion 1001 may be located on the back shell 101. A first cavity 100 may be formed between the back shell 101 and the display module 102. The connecting member 21 may include a first housing 2101 and a second housing 2102. The first housing 2101 may be fixedly connected to the second housing 2102. The second connection portion 2001 may be located on the first housing 2101. The support rod 23 may be connected to the second housing 2102. A second cavity 210 may be formed between the first housing 2101 and the second housing 2102. The first magnetic attraction assembly 6 may be located in the first cavity 100 and may be attached to the back shell 101, and the first magnetic attraction assembly 6 may be arranged corresponding to the first connection portion 1001. The second magnetic attraction assembly 7 may be located in the second cavity 210 and may be attached to the first housing 2101, and the second magnetic attraction assembly 7 may be arranged corresponding to the second connection portion 2001. When the first magnetic attraction assembly 6 and the second magnetic attraction assembly 7 magnetically attract each other, the first housing 2101 and the back shell 101 may contact and abut against each other.

In addition, a heat dissipation port 103 may be formed on each of an upper side and a lower side of the back shell 101, communicated with the first cavity 100, to improve heat dissipation efficiency.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. A vehicle-mounted display, comprising:

a display device, arranged with a first connection portion on a back side of the display device;

a support, configured to support the display device and arranged with a second connection portion, wherein the second connection portion is detachably connectable to the first connection portion;

a first input mechanism, arranged on the support;

a first electrical connection mechanism and a first magnetic attraction assembly, both arranged on the first connection portion; and a second electrical connection mechanism and a second magnetic attraction assembly, both arranged on the second connection portion, and the second electrical connection mechanism being electrically connected to the first input mechanism;

wherein when the first connection portion is connected to the second connection portion, the first electrical connection mechanism is electrically connected to the second electrical connection mechanism; and wherein the first magnetic attraction assembly and the second magnetic attraction assembly are arranged to magnetically connect the first connection portion and the second connection portion only when the first connection portion and the second connection portion are in a predetermined relative orientation, thereby preventing the first connection portion and the second connection portion from being connected to each other in an incorrect orientation.

2. The vehicle-mounted display according to claim 1, wherein the first magnetic attraction assembly comprises a first magnetic member and a second magnetic member, and the second magnetic attraction assembly comprises a third magnetic member and a fourth magnetic member;

the first magnetic member and the third magnetic member are configured to magnetically attract each other, and the first magnetic member and the fourth magnetic member are configured to magnetically repel each other; the second magnetic member and the fourth magnetic member are configured to magnetically attract each other, and the second magnetic member and the third magnetic member are configured to magnetically repel each other.

3. The vehicle-mounted display according to claim 1, wherein the first connection portion is arranged with a first mating member, the second connection portion is arranged with a second mating member configured to mate with the first mating member, and when the first mating member and the second mating member are mated and connected with each other, the first electrical connection mechanism and the second electrical connection mechanism are in electrical contact with each other.

4. The vehicle-mounted display according to claim 3, wherein one of the first mating member and the second mating member is a mating recess, and the other of the first mating member and the second mating member is a mating protrusion, and the mating protrusion is configured to be received in the mating recess.

5. The vehicle-mounted display according to claim 1, wherein the first input mechanism comprises at least one of a first power interface and a first audio/video signal input interface.

6. The vehicle-mounted display according to claim 1, further comprising a second input mechanism, wherein the second input mechanism is arranged on the display device and comprises at least one of a second power interface and a second audio/video signal input interface.

7. The vehicle-mounted display according to claim 1, wherein the first input mechanism comprises a first power interface and a first audio/video signal input interface;

the vehicle-mounted display further comprises a second input mechanism arranged on the display device, and the second input mechanism comprises a second power interface and a second audio/video signal input interface;

when the display device is connected to the support, the first power interface, the first audio/video signal input interface, the second power interface, and the second audio/video signal input interface face a same side of the vehicle-mounted display.

8. The vehicle-mounted display according to claim 1, wherein the support comprises:

a connecting member, wherein the second connection portion is arranged on the connecting member, and when the first connection portion and the second connection portion are mated and connected with each other, the connecting member abuts against the back side of the display device;

a mounting base, configured to be mounted to a central control console of a vehicle; and a support rod, comprising a first end and a second end which are arranged opposite each other, wherein the first end of the support rod is connected to the connecting member, and the second end of the support rod is connected to the mounting base.

9. The vehicle-mounted display according to claim 8, wherein the connecting member comprises a connecting plate and a first ball joint portion, the second connection portion is arranged on the connecting plate, and the first ball joint portion is arranged on a side of the connecting plate away from the second connection portion;

the first end of the support rod is configured as a spherical structure and is connected to the first ball joint portion in a form of a ball joint.

10. The vehicle-mounted display according to claim 8, wherein the mounting base comprises a mounting plate and a second ball joint portion, the mounting plate is configured to be attached to the central control console of the vehicle, and the second ball joint portion is arranged on a side of the mounting plate facing away from the central control console;

the second end of the support rod is configured as a spherical structure and is connected to the second ball joint portion in a form of a ball joint.

11. The vehicle-mounted display according to claim 8, wherein the display device comprises a back shell and a display module, the back shell is connected to the display module, the first connection portion is arranged on the back shell, and the back shell and the display module cooperatively define a first cavity;

the connecting member comprises a first housing and a second housing, the first housing is fixedly connected to the second housing, the second connection portion is arranged on the first housing, the support rod is connected to the second housing, the first housing and the second housing cooperatively define a second cavity;

the vehicle-mounted display further comprises a first magnetic attraction assembly and a second magnetic attraction assembly, the first magnetic attraction assembly is arranged in the first cavity and attached to the back shell, and the second magnetic attraction assembly is arranged in the second cavity and attached to the first housing;

wherein the first magnetic attraction assembly and the second magnetic attraction assembly are configured to magnetically attract each other, enabling the first housing and the back shell to be abutted against each other or separated from each other.

12. The vehicle-mounted display according to claim 1, wherein the first electrical connection mechanism and the second electrical connection mechanism are configured to electrically contact each other in a direction substantially perpendicular to the back side of the display device when the first connection portion and the second connection portion are connected to each other.

13. The vehicle-mounted display according to claim 1, wherein the first connection portion is arranged at a central region of the back side of the display device such that the support supports the display device at the central region of the back side of the display device.

* * * * *